Nov. 9, 1948.　　　C. W. WERNER　　　2,453,390

STABILIZING IRON

Filed Sept. 11, 1944

INVENTOR.

Clarence W. Werner

BY Victor J. Evans & Co.

ATTORNEYS

Patented Nov. 9, 1948

2,453,390

UNITED STATES PATENT OFFICE 2,453,390

STABILIZING IRON

Clarence W. Werner, Hansen, Idaho

Application September 11, 1944, Serial No. 553,627

1 Claim. (Cl. 97—47)

The invention relates to a tractor attachment, and more especially to a stabilizing iron for tractor use.

The primary object of the invention is the provision of a device of this character, wherein it is useable for many flat tooled pieces of machinery, such as field cultivators, corrugators, crowners, bean cutters, and some makes of plows, etc., and is for the purpose of eliminating side play of the ground working tools of such implements under draft thereof by a tractor or the like, to keep such tools in line with the latter when in operation.

Another object of the invention is the provision of a device of this character, wherein it can be readily and conveniently applied in working position, without the use of keys, fasteners or other like tackings, and does not interfere with the power lift arms for the raising and lowering of the tools with respect to the soil, but eliminates side play thereto.

A further object of the invention is the provision of a device of this character, which is simple in construction, thoroughly reliable and efficient in operation, strong, durable, readily and easily applied and removed with dispatch, resists side play to the power lift arms of a tractor or the like, and inexpensive to manufacture and install.

With these and other objects in view, the invention consists in the features of construction, combination and arrangement of parts as will be hereinafter more fully described, illustrated in the accompanying drawing, which shows the preferred embodiment of the invention in its applied form, and pointed out in the claim hereunto appended.

In the accompanying drawing.

Similar reference characters indicate corresponding parts throughout the several views in the drawing.

Figure 1:
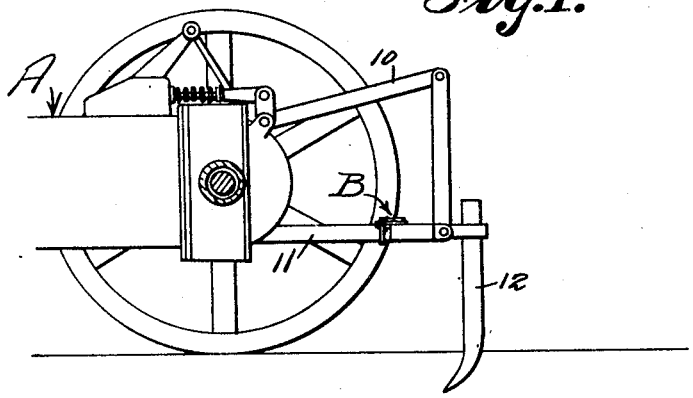
Figure 1 is a fragmentary side view of a tractor with its power lift arms, and the device constructed in accordance with the invention in an applied position.
Figure 2:
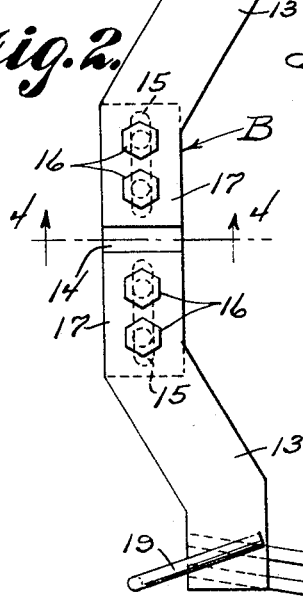
Figure 2 is a top plan view of the device removed.
Figure 3:
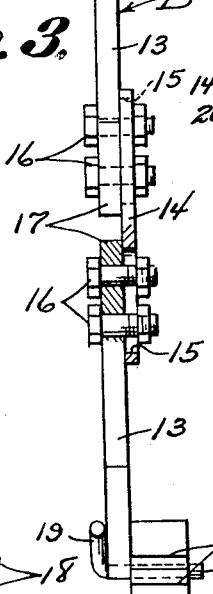
Figure 3 is an edge elevation, partly broken away.

Referring to the drawing in detail, A designates generally a portion of a tractor, more especially the "Fordson" type, having, as usual, the upper and lower power lift arms 10 and 11, respectively, while to the lower arms 11 is attached the agricultural implement, and in this instance, the latter is shown as a cultivator 12, yet it may be a renovator, crowner, bean cutter, corrugator, or other flat tooled pieces of machinery, and some makes of plows or the like.

Adapted to be applied to the lower arms 11 is the attachment or device constructed in accordance with the invention, and which is generally denoted at B, as will be hereinafter fully described.

The device or attachment B comprises a sectional bridge member involving outer elbow form legs 13 and intermediate saddling plate 14, respectively, which latter is provided with elongated slots 15 receiving nut carrying bolts 16, which are passed through the ends 17 of the legs overlapping the said plate 14, so that adjustable connection is had therebetween for the extending or retracting of such legs to give the proper spread to the device or attachment in the application thereof.

The legs and plate are flat-faced and the ends 17 of the former are of the same width as the plate 14. The legs 13 at their outer ends have depending from the under sides thereof spaced vertically disposed parallel wings 18, which in their pairs upon these outer ends constitute inside and outside retaining stops for the lower arms 11, which fit therebetween, and in this manner eliminate any side play to the implement 12 coupled thereto, and maintain the latter in the line of draft of the tractor A or the like. The pairs of wings 18 are set in rearward diverging relation to each other in conformity with the disposition of the lower arms 11 on the tractor A.

The outer ends of the arms carry inverted substantially L-shaped brackets 19, which are welded or otherwise secured in place, and the vertical branches 20 of which frictionally engage the outermost flat faces of these arms 11 when engaged between the wings 18, and in this manner the device or attachment B is maintained in place for use as a stabilizer iron for the implement, as best seen in Figure 1 of the drawing.

Figure 4:
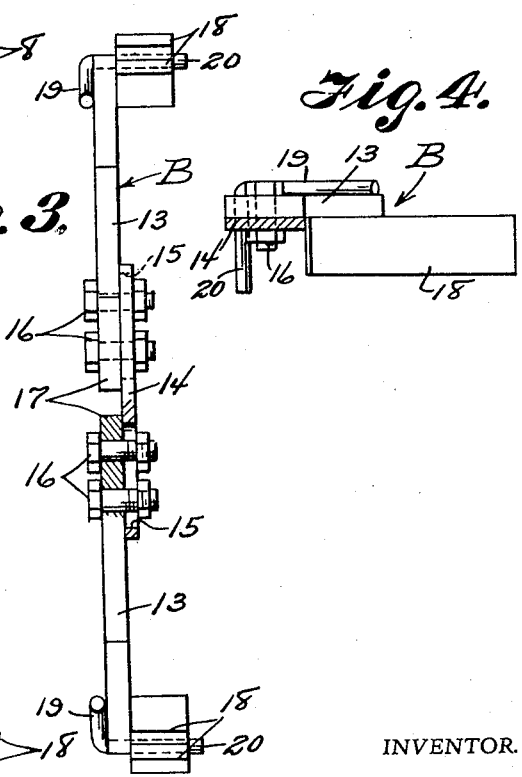
Figure 4 is a sectional view taken on the line 4—4 of Figure 2 looking in the direction of the arrows.

The device or attachment B prevents lateral or side play of the implement 12 and holds the latter in the line of draft of the tractor A when coupled with the power lift bars thereof. The wings 18 are united with the outer ends 17 of the legs 13 and depend from the under sides of the latter, as best seen in Figure 4 of the drawing, so that the pair of these wings straddle the arms 11 when the device or attachment B is applied thereto.

The brackets 19 are reversely angled to the angular disposition of the wings 18, and the ends 20 of these brackets may be inherently resilient for frictional contact with the arms 11.

What is claimed is:

An attachment of the kind described, comprising a sectional bridge member, having inclined leg sections disposed in opposite extending relation to each other, a saddling plate connecting the inner ends of the sections in adjustable relation to each other, by means of elongated slots in said plate, and fastening means in said sections, vertically disposed parallel wings secured to the outer ends of said leg sections in spaced angular relation to each other, and L-shaped brackets secured to the outer ends of said leg sections above said wings for attaching said legs at their outer ends to a farm implement.

CLARENCE W. WERNER.

REFERENCES CITED

The following references are of record in the file of this patent:

UNITED STATES PATENTS

| Number | Name | Date |
|---|---|---|
| 241,855 | Fleming | May 24, 1881 |
| 301,831 | Rea | July 8, 1884 |
| 536,929 | Hoober | Apr. 2, 1895 |
| 662,195 | Jelen | Nov. 20, 1900 |
| 1,053,221 | Rice | Feb. 18, 1913 |
| 1,761,491 | Plein | June 3, 1930 |
| 2,368,631 | Blalock | Feb. 6, 1945 |